United States Patent [19]
Chareire

[11] 4,392,459
[45] Jul. 12, 1983

[54] FOUR STROKE THERMAL ENGINE CAPABLE OF TEMPORARY BOOST

[75] Inventor: Jean-Louis Chareire, Levallois, France

[73] Assignee: Societe Nationale Industrielle Aerospatiale, Paris, France

[21] Appl. No.: 348,868

[22] Filed: Feb. 16, 1982

[30] Foreign Application Priority Data

Feb. 18, 1981 [FR] France ............................ 81 03201

[51] Int. Cl.³ .................. F02B 69/06; F02B 41/00; F01L 9/02; F01L 1/34
[52] U.S. Cl. .................. 123/21; 123/90.11; 123/90.15; 123/318; 123/433
[58] Field of Search ............. 123/21, 90.11, 90.15, 123/318, 433

[56] References Cited

U.S. PATENT DOCUMENTS

| 1,077,363 | 11/1913 | Nash | 123/21 |
| 2,178,152 | 10/1939 | Walker | 123/21 |
| 3,019,776 | 2/1962 | Clavell | 123/21 |
| 3,100,478 | 8/1963 | Crooks | 123/21 |

FOREIGN PATENT DOCUMENTS

| 425377 | 2/1926 | Fed. Rep. of Germany | 123/21 |
| 544741 | 2/1932 | Fed. Rep. of Germany | 123/21 |
| 236796 | 7/1925 | United Kingdom | 123/21 |

Primary Examiner—Wendell E. Burns
Attorney, Agent, or Firm—Merriam, Marshall & Bicknell

[57] ABSTRACT

The invention relates to a thermal engine provided with inlet and exhaust valves and with a system for controlling said engine comprising a computer which regulates opening and closure of said valves and which imposes on said engine an operation close to the one corresponding to minimum specific fuel consumption. According to the invention, this assembly is characterized in that said engine is essentially of the four-stroke cycle type, in that said system comprises means adapted to detect overloads of the engine and means adapted to cause the engine to operate exceptionally in two-stroke mode, these latter means being actuated by said detection means when the detected overload exceeds a predetermined threshold so that in that case the engine passes to two-stroke operation, four-stroke operation being resumed as soon as the overload has disappeared. The invention leads to obtaining a low consumption of fuel for increased power.

7 Claims, 4 Drawing Figures

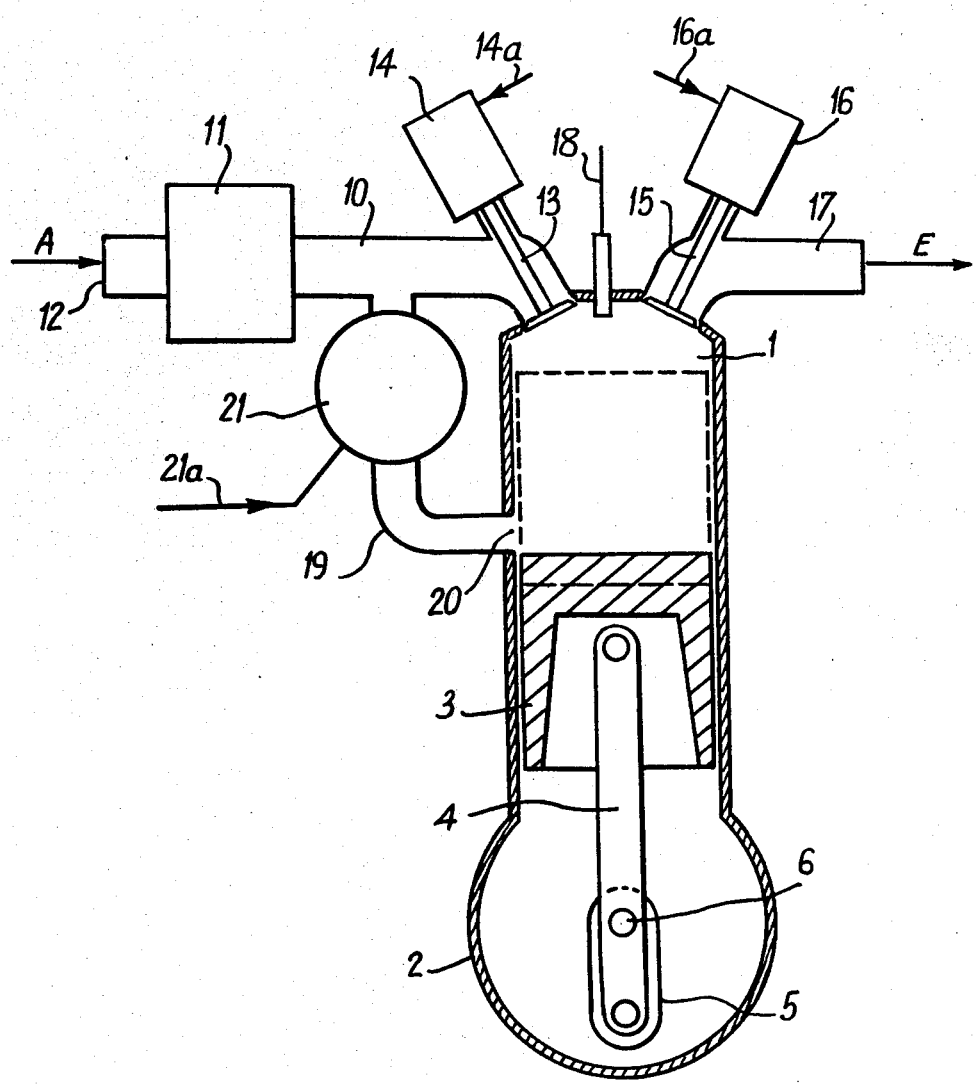

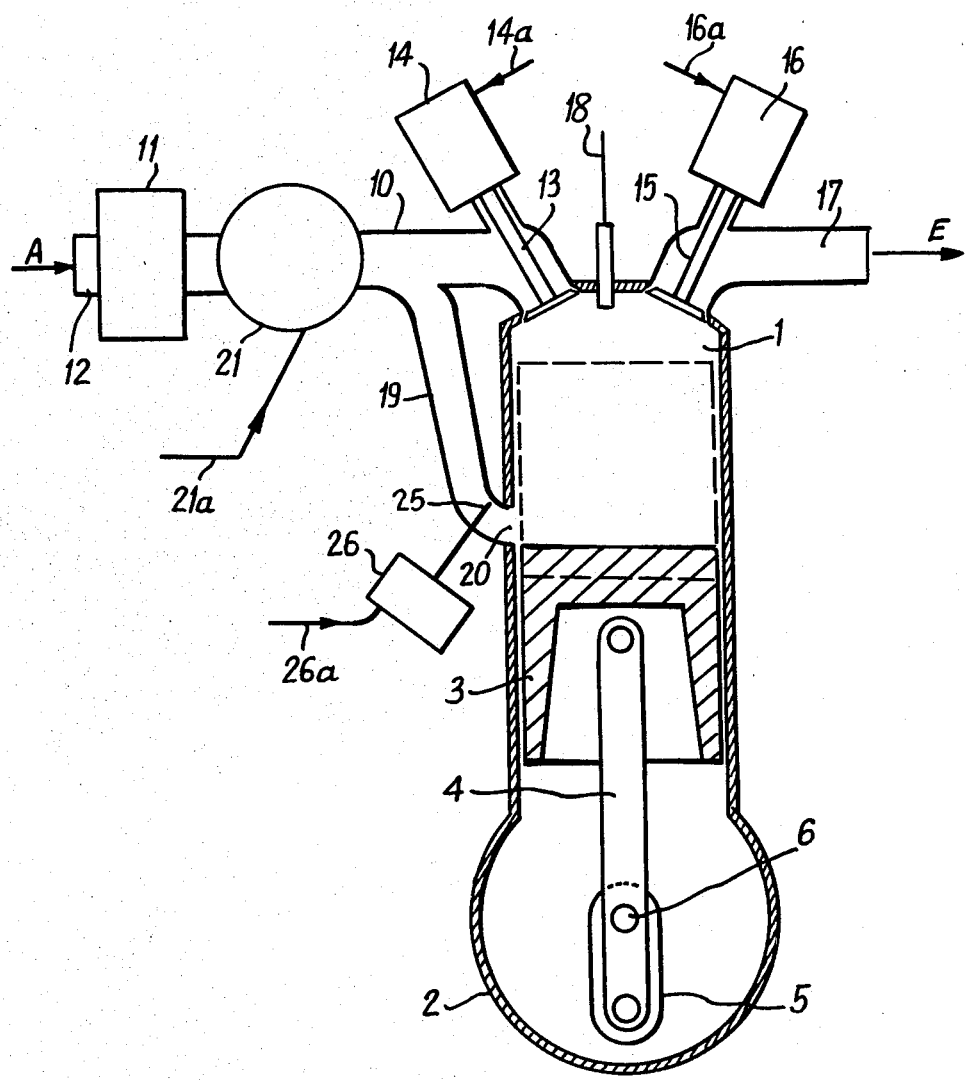

FOUR STROKE THERMAL ENGINE CAPABLE OF TEMPORARY BOOST

The present invention relates to a low-consumption thermal engine supplied with air and any conventional fuel:gasoline, Diesel oil, alcohol, etc. . . and adapted in particular to propel a vehicle.

As is known, the following may be mentioned among the causes of poor energetic yield of present power units:

(a) the fact that the vehicles use their engine under very variable conditions of speed and power, whilst adjustments of carburation, induction and exhaust are optimized only for one speed and one power;

(b) the fact that these vehicles use their engine in the majority of cases at a speed much higher than that which would be necessary for obtaining the desired power, in order to be prepared for a sudden considerable excess of power without modifying the r.p.m. of the engine (restart of the vehicle).

The present invention is concerned with a vehicle of which all the mechanical functions are managed by a suitably programmed computer.

Such arrangements are already known and their practical solutions are based simply on a good knowledge of the use of software.

Among the functions which may be managed by computer are carburation and the positions of opening and closure of the inlet and exhaust valves. Cause (a) of poor yield of the power unit is thus considerably diminished. However, it is necessary to have an individual control of movement of each valve, responding to the orders of the computer. This type of control may be of different known types. Systems of electromagnetic pushing (comprising a solenoid in various forms) or hydroelectromagnetic systems may be mentioned. These latter systems, much less cumbersome, are schematized by a hydraulic drive force controlled by an electromagnetic slide valve. These systems may be highly reliable and their maximum energy consumption equal to that of a conventional cam shaft which is of course eliminated on such computer-controlled engines.

Under these conditions, the invention concerns more precisely point (b) hereinabove.

If in fact reference is made to accompanying FIG. 1 which shows an example of curves of specific consumptions as a function of the speed of rotation N of the engine and of the required power P, it will be clearly observed that, for the same power, the engine should be rotated the least quickly possible. The point of operation of the engine should, according to the desired power, always be found on the minimal consumption curve (K) and which, as is seen, is very close to that of the maximum power which the engine may furnish at each of its r.p.m.'s. In practice, in a present automobile, the transmission ratios are such that the curve (L) on which are found the points of operation of the engine is much lower. The engine therefore rotates more quickly than is sufficient but, on the other hand, it has a considerable reserve of power at each r.p.m. (except obviously, near the zone of use at maximum power).

It is therefore an object of the present invention to provide a considerable reserve of instantaneously available power, whilst having a point of operation of the engine which is very close to the curve (K) of specific minimal consumption of the engine.

To this end, according to the invention, the assembly of a thermal engine provided with inlet and exhaust valves and with a system for controlling said engine comprising a computer which regulates opening and closure of said valves and which imposes on said engine an operation close to the one corresponding to minimum specific fuel consumption, is noteworthy in that said engine is essentially of the four-stroke cycle type, in that said system comprises means adapted to detect overloads of the engine and means adapted to cause the engine to operate exceptionally in two-stroke mode, these latter means being actuated by said detection means when the detected overload exceeds a predetermined threshold so that, in the case, the engine passes to two-stroke operation, four-stroke operation being resumed as soon as the overload has disappeared.

Such overload detection means may be of any known type, for example, in the automatic gear change devices.

The nominal cycle of the engine is thus four-stroke, which leads to a good yield and low pollution (particularly by oil). During acceleration or climbing, the cycle passes to two-stroke and a supercharge may possibly be added by starting up a supercharger which is preferably electric. Thus, for the same r.p.m., the power may be multiplied by two to three depending on the supercharge rate.

This two-stroke cycle operation is only transistory. It gives the power unit time to increase the speed of the engine, therefore its power, sufficiently.

The combustion chamber of the engine is in all points similar to that of an ordinary four-stroke engine. The inlet and exhaust valves are controlled individually by the computer by means of a hydro-electromagnetic system, for example.

The lower part of the engine may on the other hand be similar to that of a conventional two-stroke engine, except concerning the opening (port) and the exhaust channel, which are eliminated.

On the lower part of the inlet manifold is disposed a conventional supercharger controlled by an electric motor. The supercharger may, in a variant of the invention, be placed so as to function equally well for supercharging the motor operating in the two-stroke or the four-stroke made. In this case, the lower inlet manifold (towards the crank case) will be closed by an electrovalve when the engine operates in the four-stroke mode.

On the upper part of the transfer passages (2 channels disposed so as to create maximum turbulence in the combustion chamber), an electrovalve is disposed at the limit of the cylinder.

Operation is as follows:

In four-stroke operation, the induction and exhaust are effected by the valves of the combustion chamber, as is conventional. The order of opening of said valves in four-stroke operation is furnished by the computer. The electrovalves of the transfer passages are closed and the supercharger is stopped (or the electrovalve of the inlet channel towards the crank case is closed if the supercharger is common to the upper and lower inlet, or if there is no supercharger).

In two-stroke operation, induction takes place in the lower casing by starting up the supercharger and (possibly) opening the electrovalve of the lower inlet channel. The inlet valve of the cylinder remains constantly closed. The electrovalves of the transfer passages are constantly open and, finally, the exhaust valve receives from the computer the order of operation according to a two-stroke cycle (one opening per revolution with advance with respect to the arrival of the piston at bottom dead centre). If there is no supercharger, the computer gives the order of opening of the lower inlet channel.

Lubricating this type of engine raises a particular problem (cooling of the piston is not to be taken into consideration as it heats up little, preferably having an insulating head).

To fight against pollution by oil, lubrication by a mixture of oil and gasoline is not employed.

In fact, the engine most often operates in four-stroke mode.

However, it is necessary not to have an apparent volume of oil in the bottom of the case, which would be incompatible with two-stroke operation.

Lubrication is therefore ensured by circulation of oil in the crank-shaft, the connecting rod and the piston. The oil, in just the sufficient quantity, is distributed to the bottom of the groove of the lower ring of the piston, the latter possessing an upper scraper ring.

Oil recovery is effected in the bottom of the crank case due to a recovery device of known type (dry sump). The oil evacuation orifice is chosen to be sufficiently small in order not to disturb two-stroke operation.

Due to this device, the engine consumes oil (and in a quantity limited to a maximum) only during its two-stroke operation.

In a variant of the invention, the engine no longer uses its crank-case for promoting filling of the cylinder in two-stroke operation.

In this case, the lower inlet pipe opens out directly into the cylinder at bottom dead centre at the level of which the transfer passage (eliminated in this case) open out in an ordinary two-stroke engine; it is the supercharger which then effects, alone, all the work of filling the cylinder, the case of the engine no longer having a role to perform in filling. Conventional lubrication by projection of oil may be used as in an ordinary four-stroke engine.

The invention will be more readily understood on reading the following description with reference to the accompanying drawings, in which:

FIG. 3 shows an embodiment in which two-stroke operation is effected without transfer of gas.

FIG. 4 shows an embodiment according to which a variable supercharge is effected both during two-stroke operation and during four-stroke operation.

In these Figures, like references designate like elements.

Figure 2:
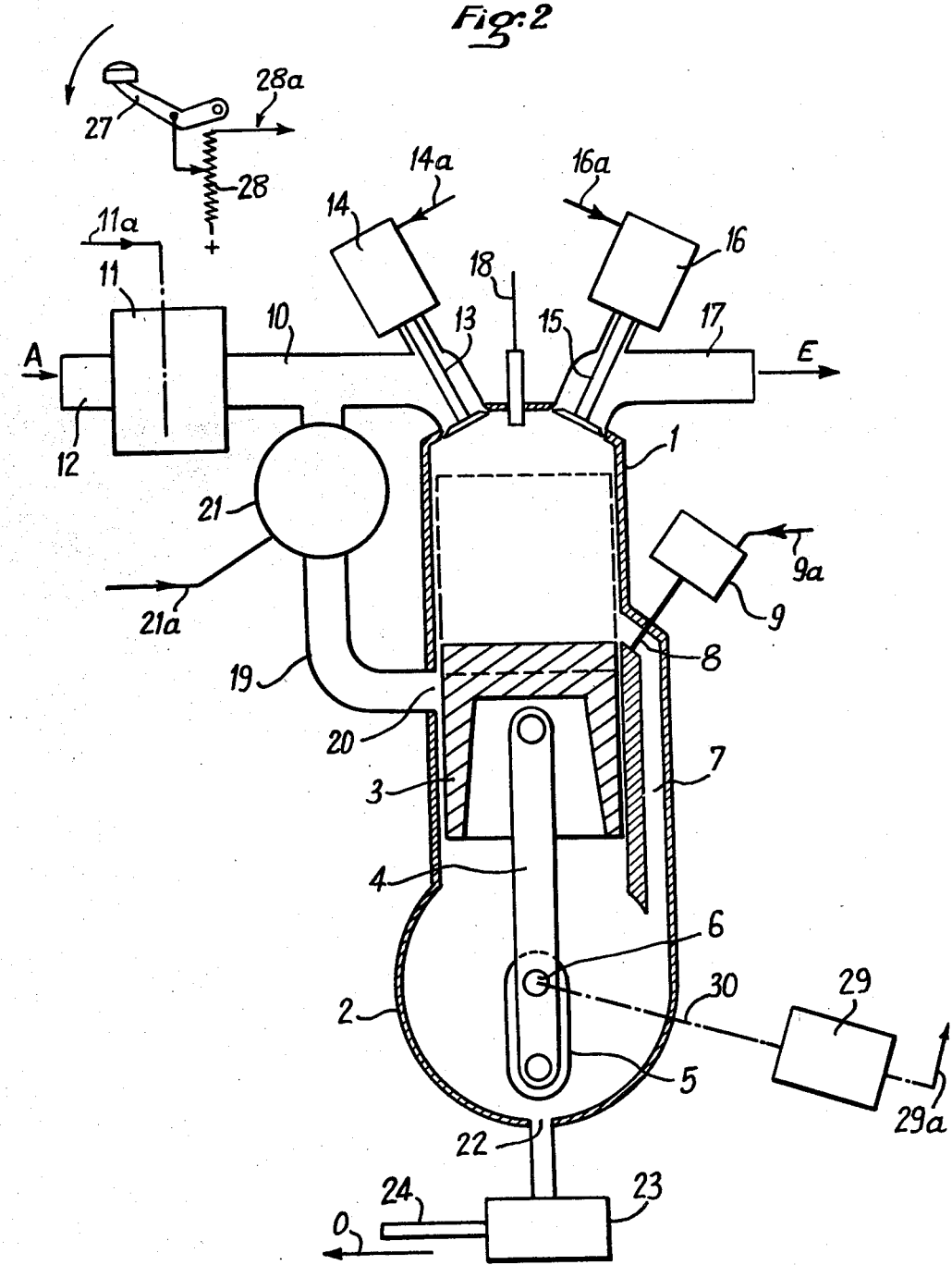
FIG. 2 shows an embodiment in which the two-stroke operation employs a transfer of the gas via the case.

The embodiment of the engine according to the invention, illustrated in FIG. 2, comprises a cylinder 1 fast with a crank case 2.

A piston 3 slides in reciprocating manner in the cylinder 1 between the lower position (bottom dead centre) shown and the upper position (top dead centre) indicated in broken lines. The piston 3 is connected by a connecting rod 4 to a conventional crankshaft 5 rotating about axis 6. The heigth of the piston 3 is at least equal to its stroke, in order to obturate the port 20 in low position, and to release it in high position, as will be seen hereinafter.

One or more transfer passages 7 connect the crank case 2 to one or more openings or ports 7a located in the wall of the cylinder 1 immediately above the piston 2 when the latter is at bottom dead centre.

A valve 8, controlled by an electromagnet 9, closes the transfer passage 7 when the engine according to the invention operates in four-stroke mode. It is controlled by a computer (not shown) to which it is connected by a connection 9a.

The top of the cylinder 1, or cylinder head, comprises an inlet manifold 10 connected to a carburettor device 11, in the event of the engine according to the invention not using direct injection of the fuel, this carburettor 11 being supplied with air through a pipe 12.

The port through which the manifold 10 opens into the cylinder head is controlled by an inlet valve 13, preferably controlled by an electromagnetohydraulic device 14 itself controlled by said computer and connected thereto by a connection 14a.

The cylinder head also comprises an exhaust manifold 17 of which the port into said cylinder head is controlled by an exhaust valve 15 preferably controlled by an electromagnetohydraulic device 16, itself controlled by said computer and connected thereto by a connection 16a.

When the motor operates with controlled ignition, the latter is effected with the aid of a sparking plug 18 activated via said computer.

When said engine operates with self-ignition, the sparking plug 18 is replaced by a reheat plug and possibly an injector for example a Diesel injector ("Diesel" operation). In this case, the carburettor device 11 is eliminated.

Between the carburettor 11 and the seat of the valve 13, the manifold 10 comprises a by-pass channel 19 which connect it to the cylinder 1 via a port 20 placed in the wall of said cylinder, immediately below the piston 3 when it is at top dead centre (but obturated by said piston at bottom dead centre) and via either a supercharger or an electrovalve, shown at 21. The supercharger 21 acts at stop as an electrovalve and obturates channel 19 in this case. It is preferably activated by an electric motor controlled by said computer to which it is connected by a connection 21a. It may also be actuated by the shaft of the engine by means of an electromagnetic clutch. According to its operating mode, the supercharger 21 furnishes at its outlet an absolute pressure of 1 to 4 bars and is activated only when the engine operates in two-stroke mode. Similarly, when it is replaced by a simple electrovalve, the latter is activated for opening only for two-stroke operation.

The bottom of the case 2 is connected by a port 22 to a known device 23 for recovering oil, of the "dry sump" type which evacuates the oil from the case towards a tank via a conduit 24.

The carburettor 11 is controlled by an electromechanical device which receives its orders from the computer (link 11a). The order of acceleration given by the driver 15 therefore not translated by a proportional increase in the rate of flow of the gas. Adjustment of this rate of flow takes into account the r.p.m. of the engine, the power demanded thereof, the cycle of operation (two or four-stroke), the speed of the supercharger and the tendency of the phenomenon of knock to occur. These various elements (and others, if necessary), are taken over without difficulty by the software of the computer. The order of the driver is transmitted to the computer via a pedal 27 activating a position transmitter 28.

It is possible to transmit to the computer the value of the load applied to the engine with the aid of a torquemeter 29 connected to the shaft of the engine 6 via a link 30, and to said computer via a link 29a.

In normal load operation, the computer controls the operation of the engine in a four-stroke cycle following the curve (K) of minimum consumption. In this case, the fuel supply is effected via manifold 10 and the valve 13, and gas exhaust through valve 15 and manifold 17; moreover, the manifold 19 is obturated by the supercharger 21 and the same applies to the transfer passages 7, by valves 8.

When an order of acceleration, therefore of overload for the present speed of the engine, is given by the driver, the computer immediately imposes two-stroke operation as well as a partial supercharging. The rate of supercharging associated with the speed of the supercharger will be determined by the computer, which will take into account, on the one hand, the necessity, in reply to the driver's desire, to furnish a sufficient instantaneous power, on the other hand, the necessity to limit the filling of the engine to a value which does not risk provoking the detrimental phenomenon of knocking. A known knocking detector will therefore be used and its indications will serve the computer to determine the maximum rate of instantaneous supercharging as well as the advance to appropriate ignition.

As soon as the momentary supercharging process (change of four-stroke two stroke cycle and possible supercharging) ceases to be indispensable, either because the increase in the engine's r.p.m. obtained during their operation renders the new power at the point of minimum consumtion in four-stroke operation sufficient, or because it is desired to return to the initial power, the computer furnished the indications for return of the non-supercharged four-stroke cycle. To give these orders, the computer takes particular account of the indication furnished by the driver on the accelerator pedal and also of a measured value of the drive torque.

FIGS. 3 and 4 show variant embodiments in which the two-stroke cycle is obtained without pre-supercharging in the crank case 2 and without transfer of the carburetted mixture or of the air. The transfer passages 7, the electrovalve 9 and the device 23 are also eliminated. Lubrication is ensured in conventional manner by projection of oil.

In the system of FIG. 3, the supercharger 21 is necessarily used and activated as before, but the channel 19 connects the outlet of said supercharger to the cylinder 1 via a port 20 located in its wall immediately above the piston 3 when the latter is at bottom dead centre.

In two-stroke operation, the induction pressure of gas in the cylinder is solely furnished by the supercharger 21.

The other elements of the system of FIG. 2 remain the same and are indicated by the same references.

It is possible to add in channel 19 an electrovalve such as 8,9,9a in the vicinity of the port 20 in the cylinder 1, said valve obturating the channel 19 during the phases of operation of said engine in four-stroke operation.

FIG. 4 shows an embodiment of the invention in which a variable supercharging is effected both in two-stroke and in four-stroke operation.

Figure 1:
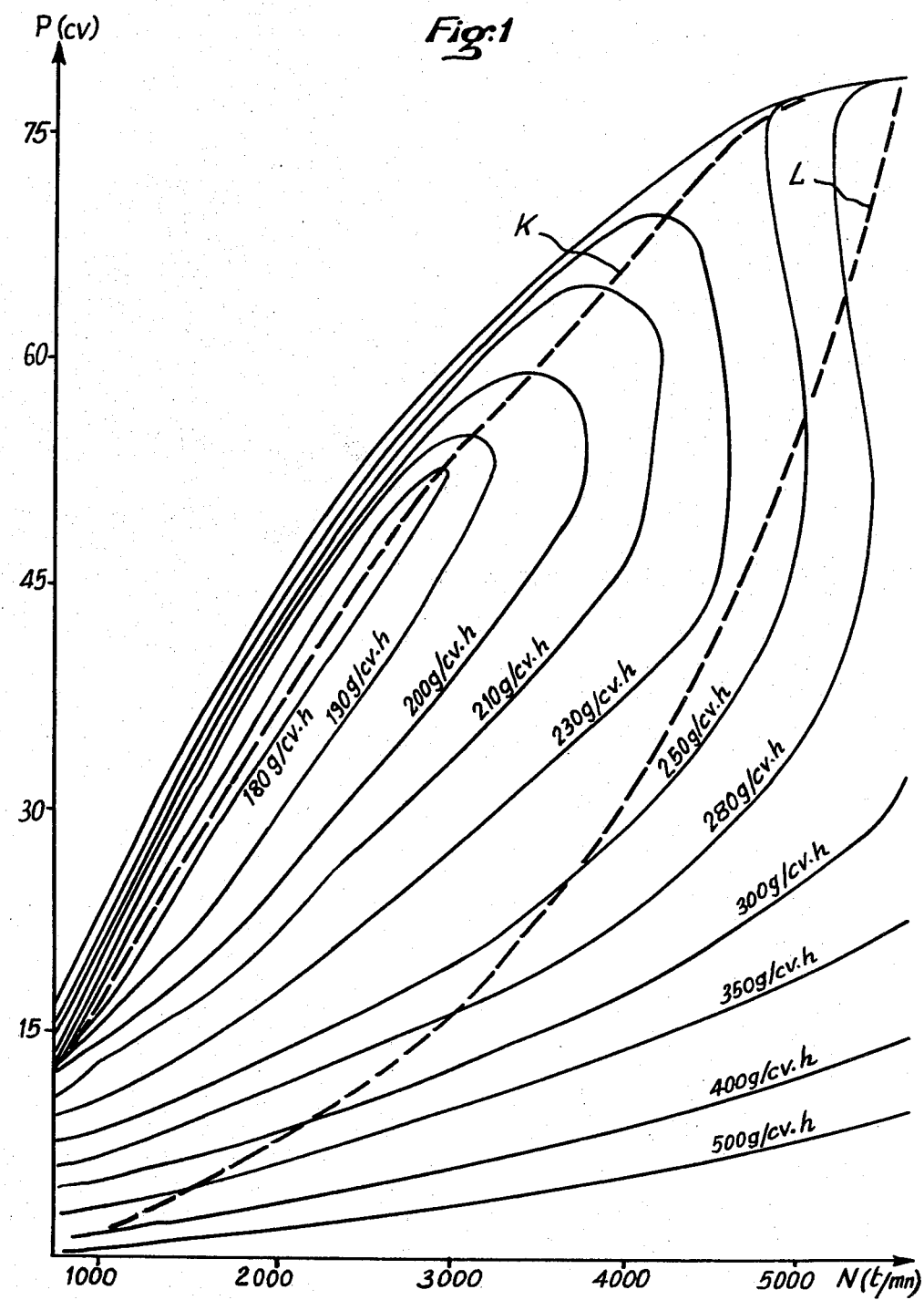
FIG. 1 shows curves of specific consumptions.

Two stroke operation supply may be effected with or without transfer by the crank case 2. It is shown here without transfer. With respect to the embodiment of FIG. 1, the channel 19 directly joins the inlet manifold 10, the supercharger 21 being placed between the join of 10 and 19 and the carburettor device 11, if the latter is used. An electrovalve 26 obturates the channel 19 near the cylinder 1 with the aid of a valve 25 during the phases of operation in four-stroke operation. This electrovalve 26 is controlled by the computer and connected thereto by a connection 26a.

The other elements remain the same as those of the embodiments described hereinbefore.

According to this embodiment, the law of operation of the supercharger 21 is not a direct function of the r.p.m. of the engine. The supercharger 21 is driven either by a variable speed electric motor, said speed being determined for example by said computer, or by the drive shaft via a speed variator controlled either by said computer or by a mechanical or electromechanical device taking into account the position of the accelerator and the load of the engine.

For example, when the engine according to the invention operates in a four-stroke cycle, when it is at the limit of its maximum power with a substantially normal supply, and when a small additional power is demanded of it, it is possible to supercharge the engine, which may be preferable to passing to two-stroke operation. This variation in supply, at substantially constant r.p.m. also ensures a solution of continuity during passages from four stroke/two stroke operation, which may be separated by a supercharged four-stroke phase.

Supercharging is also useful during a phase of two-stroke operation when the load increases and the engine furnishes its maximum power with normal supply.

This variation in supply makes it possible to linearize the power curve of the engine over a reduced range of r.p.m.'s, which enables its fuel consumption to be optimized.

In this way, in a reduced r.p.m. range and possibly at constant r.p.m., the engine according to the invention may furnish a considerable range of torques.

When the transfer of the gas by the case is not used for two-stroke operation, it is advantageous if the supercharger rotates for example 1.5 to 2 times more quickly during such a phase of operation with respect to a phase of four-stroke operation, it having in this case to furnish, alone, the filling pressure of the cylinder.

What is claimed is:

1. In a thermal engine assembly provided with inlet and exhaust valves and with a system for controlling said engine comprising a computer which regulates opening and closure of said valves and which imposes on the engine an operation close to the one corresponding to minimum specific fuel consumption, said engine is essentially of the four-stroke cycle type, said system comprises means adapted to detect overloads of the engine and means adapted to cause the engine to operate exceptionally, in two-stroke mode, these latter means being actuated by said detection means when the detected overload exceeds a predetermined threshold so that the engine in that case passes to two-stroke operation, four-stroke operation being resumed as soon as the overload has disappeared.

2. The assembly of claim 1, in which the engine comprises an inlet manifold terminating in one or each inlet valve, wherein it comprises a by-pass connecting said manifold to a port disposed in the wall of the cylinder of the engine and said by-pass may be closed by said computer.

3. The assembly of claim 2, wherein the engine comprises one or more transfer passages connecting its sealed crank case to one or more ports disposed in the wall of the cylinder immediately above said piston when the latter is at bottom dead centre, but obturated thereby at top dead centre, said transfer passages may be closed by said computer and said port is obturated by the piston when the latter is at bottom dead centre, but released when the piston is at top dead centre.

4. The assembly of claim 2, wherein said port is obturated by the piston when the latter is at top dead centre, but released when the piston is at bottom dead centre.

5. The assembly of claim 2, wherein said by-pass may be closed by a supercharger.

6. The assembly of claim 2, wherein said by-pass may be closed by an electrovalve and a supercharger is disposed in the inlet manifold.

7. The assembly of claim 5, wherein the speed of rotation of the supercharger is independent of the speed of rotation of the engine.

* * * * *